United States Patent
Cox et al.

(10) Patent No.: US 9,682,604 B2
(45) Date of Patent: Jun. 20, 2017

(54) METHODS AND APPARATUS FOR SELECTIVE SPRING PRE-LOAD ADJUSTMENT

(71) Applicant: Fox Factory, Inc., Scotts Valley, CA (US)

(72) Inventors: Christopher Paul Cox, Capitola, CA (US); Michael David Marquez, Santa Cruz, CA (US); Everet Ericksen, Santa Cruz, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

(21) Appl. No.: 14/853,566

(22) Filed: Sep. 14, 2015

(65) Prior Publication Data

US 2016/0001623 A1    Jan. 7, 2016

Related U.S. Application Data

(63) Continuation of application No. 12/727,915, filed on Mar. 19, 2010, now Pat. No. 9,140,325.

(60) Provisional application No. 61/161,620, filed on Mar. 19, 2009, provisional application No. 61/161,552, filed on Mar. 19, 2009.

(51) Int. Cl.
| | |
|---|---|
| *F16F 1/12* | (2006.01) |
| *B60G 17/00* | (2006.01) |
| *B60G 17/02* | (2006.01) |
| *B60G 15/06* | (2006.01) |
| *F16F 9/32* | (2006.01) |

(Continued)

(52) U.S. Cl.
CPC ............ *B60G 17/021* (2013.01); *B60G 11/14* (2013.01); *B60G 15/063* (2013.01); *F16F 1/121* (2013.01); *F16F 9/3264* (2013.01); *F16F 9/56* (2013.01); *B60G 2204/1242* (2013.01); *B60G 2204/61* (2013.01); *B60G 2500/30* (2013.01); *B60G 2600/04* (2013.01); *F16F 2228/08* (2013.01)

(58) Field of Classification Search
CPC ....................................................... B60G 17/00
USPC ................. 267/218, 195, 175, 177, 221, 34
See application file for complete search history.

(56) References Cited

U.S. PATENT DOCUMENTS

| | | |
|---|---|---|
| 1,923,011 A | 8/1933 | Moulton |
| 1,948,600 A | 2/1934 | Templeton |

(Continued)

FOREIGN PATENT DOCUMENTS

| | | |
|---|---|---|
| DE | 202010012738 U1 | 12/2010 |
| EP | 304801 A2 | 3/1989 |

(Continued)

OTHER PUBLICATIONS

European Search Report, European Patent Application No. 14189773.6, May 4, 2015, 4 Pages.

(Continued)

*Primary Examiner* — Thomas J Williams
*Assistant Examiner* — James Hsiao

(57) ABSTRACT

A method and apparatus for a suspension comprising a spring having a threaded member at a first end for providing axial movement to the spring as the spring is rotated and the threaded member moves relative to a second component. In one embodiment, the system includes a damper for metering fluid through a piston and a rotatable spring member coaxially disposed around the damper and rotatable relative to the damper.

5 Claims, 4 Drawing Sheets

(51) Int. Cl.
  *F16F 9/56* (2006.01)
  *B60G 11/14* (2006.01)

(56) References Cited

U.S. PATENT DOCUMENTS

| | | | |
|---|---|---|---|
| 2,259,437 A | 10/1941 | Dean | |
| 2,492,331 A | 12/1949 | Spring | |
| 2,540,525 A | 2/1951 | Howarth et al. | |
| 2,697,600 A | 12/1954 | Gregoire | |
| 2,705,119 A | 3/1955 | Ingwer | |
| 2,784,962 A | 3/1957 | Sherburne | |
| 2,879,971 A | 3/1959 | Demay | |
| 2,991,804 A | 7/1961 | Merkle | |
| 3,085,530 A | 4/1963 | Williamson | |
| 3,087,583 A * | 4/1963 | Bruns | B66B 7/046 187/406 |
| 3,206,153 A | 9/1965 | Burke | |
| 3,284,076 A | 11/1966 | Gibson | |
| 3,528,700 A | 9/1970 | Janu et al. | |
| 3,560,033 A | 2/1971 | Barkus | |
| 3,575,442 A | 4/1971 | Elliott et al. | |
| 3,603,575 A * | 9/1971 | Arlasky | B60G 17/021 267/34 |
| 3,650,033 A | 3/1972 | Behne et al. | |
| 3,701,544 A | 10/1972 | Stankovich | |
| 3,784,228 A | 1/1974 | Hoffmann et al. | |
| 3,830,482 A | 8/1974 | Norris | |
| 4,036,335 A * | 7/1977 | Thompson | B60G 17/08 188/282.9 |
| 4,103,881 A | 8/1978 | Simich | |
| 4,348,016 A * | 9/1982 | Milly | B60G 17/021 267/177 |
| 4,366,969 A * | 1/1983 | Benya | B60G 15/063 267/117 |
| 4,474,363 A * | 10/1984 | Numazawa | B60G 15/063 267/220 |
| 4,655,440 A | 4/1987 | Eckert | |
| 4,732,244 A | 3/1988 | Verkuylen | |
| 4,744,444 A * | 5/1988 | Gillingham | F16F 9/44 137/523 |
| 4,773,671 A | 9/1988 | Inagaki | |
| 4,830,395 A | 5/1989 | Foley | |
| 4,836,578 A | 6/1989 | Soltis | |
| 4,949,262 A | 8/1990 | Buma et al. | |
| 4,949,989 A | 8/1990 | Kakizaki et al. | |
| 4,984,819 A | 1/1991 | Kakizaki et al. | |
| 5,027,303 A | 6/1991 | Witte | |
| 5,044,614 A | 9/1991 | Rau | |
| 5,060,959 A | 10/1991 | Davis et al. | |
| 5,074,624 A | 12/1991 | Stauble et al. | |
| 5,094,325 A | 3/1992 | Smith | |
| 5,105,918 A | 4/1992 | Hagiwara et al. | |
| 5,152,547 A | 10/1992 | Davis | |
| 5,203,584 A | 4/1993 | Butsuen et al. | |
| 5,236,169 A * | 8/1993 | Johnsen | B62J 1/06 248/561 |
| 5,265,902 A * | 11/1993 | Lewis | B60G 15/067 280/124.102 |
| 5,348,112 A | 9/1994 | Vaillancourt | |
| 5,390,949 A | 2/1995 | Naganathan et al. | |
| 5,542,150 A | 8/1996 | Tu | |
| 5,551,674 A * | 9/1996 | Johnsen | B60G 17/021 267/168 |
| 5,553,836 A * | 9/1996 | Ericson | B60G 11/16 267/177 |
| 5,598,337 A | 1/1997 | Butsuen et al. | |
| 5,722,645 A | 3/1998 | Reitter | |
| 5,803,443 A | 9/1998 | Chang | |
| 5,826,935 A | 10/1998 | DeFreitas | |
| 5,850,352 A | 12/1998 | Moezzi et al. | |
| 5,954,318 A | 9/1999 | Kluhsman | |
| 5,971,116 A | 10/1999 | Franklin | |
| 6,013,007 A | 1/2000 | Root et al. | |
| 6,017,047 A | 1/2000 | Hoose | |
| 6,035,979 A | 3/2000 | Forster | |
| 6,058,340 A | 5/2000 | Uchiyama et al. | |
| 6,073,736 A | 6/2000 | Franklin | |
| 6,105,988 A | 8/2000 | Turner | |
| 6,135,434 A | 10/2000 | Marking | |
| 6,244,398 B1 | 6/2001 | Girvin et al. | |
| 6,254,067 B1 | 7/2001 | Yih | |
| 6,311,962 B1 | 11/2001 | Marking | |
| 6,343,807 B1 * | 2/2002 | Rathbun | B62K 25/08 267/175 |
| 6,360,857 B1 | 3/2002 | Fox et al. | |
| 6,378,816 B1 | 4/2002 | Pfister | |
| 6,389,341 B1 | 5/2002 | Davis | |
| 6,390,747 B1 * | 5/2002 | Commins | F16B 43/009 411/231 |
| 6,427,812 B2 | 8/2002 | Crawley et al. | |
| 6,434,460 B1 | 8/2002 | Uchino et al. | |
| 6,592,136 B2 | 7/2003 | Becker et al. | |
| 6,609,686 B2 | 8/2003 | Malizia | |
| 6,623,389 B1 | 9/2003 | Campagnolo | |
| 6,732,033 B2 | 5/2004 | LaPlante et al. | |
| 6,837,827 B1 | 1/2005 | Lee et al. | |
| 6,857,625 B2 | 2/2005 | Löser et al. | |
| 6,863,291 B2 | 3/2005 | Miyoshi | |
| 6,935,157 B2 | 8/2005 | Miller | |
| 6,991,076 B2 | 1/2006 | McAndrews | |
| 7,025,367 B2 | 4/2006 | McKinnon | |
| 7,076,351 B2 | 7/2006 | Hamilton et al. | |
| 7,128,192 B2 | 10/2006 | Fox | |
| 7,135,794 B2 | 11/2006 | Kühnel | |
| 7,163,222 B2 | 1/2007 | Becker et al. | |
| 7,204,466 B2 | 4/2007 | Hsieh | |
| 7,217,224 B2 | 5/2007 | Thomas | |
| 7,287,760 B1 | 10/2007 | Quick et al. | |
| 7,289,138 B2 | 10/2007 | Foote et al. | |
| 7,292,867 B2 | 11/2007 | Werner et al. | |
| 7,293,764 B2 | 11/2007 | Fang | |
| 7,306,206 B2 | 12/2007 | Turner | |
| 7,316,406 B2 | 1/2008 | Kimura et al. | |
| 7,363,129 B1 | 4/2008 | Barnicle et al. | |
| 7,374,028 B2 | 5/2008 | Fox | |
| 7,397,355 B2 | 7/2008 | Tracy | |
| 7,469,910 B2 | 12/2008 | Münster et al. | |
| 7,484,603 B2 | 2/2009 | Fox | |
| 7,490,705 B2 | 2/2009 | Fox | |
| 7,581,743 B2 | 9/2009 | Graney | |
| 7,631,882 B2 | 12/2009 | Hirao et al. | |
| 7,673,936 B2 | 3/2010 | Hsu | |
| 7,694,987 B2 | 4/2010 | McAndrews | |
| 7,699,753 B2 | 4/2010 | Daikeler et al. | |
| 7,703,585 B2 | 4/2010 | Fox | |
| 7,726,042 B2 | 6/2010 | Meschan | |
| 7,837,213 B2 | 11/2010 | Colegrove | |
| 7,840,346 B2 | 11/2010 | Huhtala et al. | |
| 7,845,602 B1 | 12/2010 | Young et al. | |
| 7,857,325 B2 | 12/2010 | Copsey et al. | |
| 7,872,764 B2 | 1/2011 | Higgins-Luthman et al. | |
| 7,901,292 B1 | 3/2011 | Uhlir et al. | |
| 7,909,348 B2 | 3/2011 | Klieber | |
| 8,016,349 B2 | 9/2011 | Mouri | |
| 8,042,427 B2 | 10/2011 | Kawakami et al. | |
| 8,087,676 B2 | 1/2012 | McIntyre | |
| 8,091,910 B2 | 1/2012 | Hara | |
| 8,127,900 B2 | 3/2012 | Inoue | |
| 8,136,877 B2 | 3/2012 | Walsh | |
| 8,191,964 B2 | 6/2012 | Hsu | |
| 8,210,106 B2 | 7/2012 | Tai et al. | |
| 8,256,732 B1 | 9/2012 | Young et al. | |
| 8,262,100 B2 | 9/2012 | Thomas | |
| 8,285,447 B2 | 10/2012 | Bennett et al. | |
| 8,286,982 B2 | 10/2012 | Plantet | |
| 8,292,274 B2 * | 10/2012 | Adoline | F16F 9/0218 267/168 |
| 8,308,124 B2 | 11/2012 | Hsu | |
| 8,317,261 B2 | 11/2012 | Walsh | |
| 8,328,454 B2 | 12/2012 | McAndrews et al. | |
| 8,336,683 B2 | 12/2012 | McAndrews et al. | |
| 8,458,080 B2 | 6/2013 | Shirai | |
| 8,550,551 B2 | 10/2013 | Shirai | |

(56) References Cited

U.S. PATENT DOCUMENTS

| | | |
|---|---|---|
| 8,596,663 B2 | 12/2013 | Shirai |
| 8,622,180 B2 | 1/2014 | Wootten et al. |
| 8,641,073 B2 | 2/2014 | Lee |
| 8,744,699 B2 | 6/2014 | Yamaguchi |
| 8,763,770 B2 | 7/2014 | Marking |
| 8,781,680 B2 | 7/2014 | Ichida |
| 8,781,690 B2 | 7/2014 | Hara |
| 8,814,109 B2 | 8/2014 | Calendrille et al. |
| 8,833,786 B2 | 9/2014 | Camp |
| 8,845,496 B2 | 9/2014 | Arrasvuori et al. |
| 8,888,115 B2 | 11/2014 | Chubbuck |
| 8,936,139 B2 | 1/2015 | Franklin et al. |
| 8,950,771 B2 | 2/2015 | Felsl |
| 8,967,343 B2 | 3/2015 | Battlogg |
| 9,073,592 B2 | 7/2015 | Hsu |
| 9,126,647 B2 | 9/2015 | Kuo |
| 9,140,325 B2 | 9/2015 | Cox |
| 9,157,523 B2 | 10/2015 | Miki |
| 9,199,690 B2 | 12/2015 | Watarai |
| 9,422,018 B2 | 8/2016 | Pelot et al. |
| 2002/0032508 A1 | 3/2002 | Uchino et al. |
| 2002/0050112 A1 | 5/2002 | Koch et al. |
| 2002/0089107 A1 | 7/2002 | Koh |
| 2002/0113347 A1 | 8/2002 | Robbins et al. |
| 2002/0185581 A1 | 12/2002 | Trask |
| 2002/0187867 A1 | 12/2002 | Ichida et al. |
| 2003/0001358 A1 | 1/2003 | Becker et al. |
| 2003/0065430 A1 | 4/2003 | Lu et al. |
| 2003/0160369 A1 | 8/2003 | LaPlante et al. |
| 2004/0004659 A1 | 1/2004 | Foote et al. |
| 2004/0075350 A1* | 4/2004 | Kuhnel ............... B60G 11/16 310/80 |
| 2004/0103146 A1 | 5/2004 | Park |
| 2004/0208687 A1 | 10/2004 | Sicz |
| 2004/0256778 A1 | 12/2004 | Verriet |
| 2005/0110229 A1 | 5/2005 | Kimura et al. |
| 2005/0239601 A1 | 10/2005 | Thomas |
| 2006/0064223 A1 | 3/2006 | Voss |
| 2006/0066074 A1 | 3/2006 | Turner |
| 2006/0163787 A1 | 7/2006 | Munster et al. |
| 2006/0175792 A1 | 8/2006 | Sicz |
| 2006/0185951 A1 | 8/2006 | Tanaka |
| 2006/0213082 A1* | 9/2006 | Meschan ............... A43B 13/182 36/27 |
| 2006/0253210 A1 | 11/2006 | Rosenberg |
| 2006/0289258 A1 | 12/2006 | Fox |
| 2007/0006489 A1 | 1/2007 | Case et al. |
| 2007/0008096 A1 | 1/2007 | Tracy |
| 2007/0032981 A1 | 2/2007 | Merkel et al. |
| 2007/0070069 A1 | 3/2007 | Samarasekera et al. |
| 2007/0213126 A1 | 9/2007 | Deutsch et al. |
| 2007/0239479 A1 | 10/2007 | Arrasvuori et al. |
| 2008/0018065 A1* | 1/2008 | Hirao ............... B60G 11/16 280/6.157 |
| 2008/0093820 A1 | 4/2008 | McAndrews |
| 2008/0099968 A1* | 5/2008 | Schroeder ............ B62K 25/08 267/166 |
| 2008/0116622 A1 | 5/2008 | Fox |
| 2008/0303320 A1 | 12/2008 | Schranz |
| 2009/0121398 A1 | 5/2009 | Inoue |
| 2009/0192673 A1 | 7/2009 | Song |
| 2009/0236807 A1 | 9/2009 | Wootten et al. |
| 2009/0261542 A1 | 10/2009 | McIntyre |
| 2009/0277736 A1 | 11/2009 | McAndrews et al. |
| 2009/0324327 A1 | 12/2009 | McAndrews |
| 2010/0010709 A1 | 1/2010 | Song |
| 2010/0044975 A1 | 2/2010 | Yablon et al. |
| 2010/0160014 A1 | 6/2010 | Galasso et al. |
| 2010/0207351 A1 | 8/2010 | Klieber |
| 2010/0244340 A1 | 9/2010 | Wootten et al. |
| 2010/0252972 A1 | 10/2010 | Cox et al. |
| 2010/0276906 A1 | 11/2010 | Galasso et al. |
| 2010/0308628 A1 | 12/2010 | Hsu |
| 2010/0314917 A1 | 12/2010 | Hsieh |
| 2010/0327542 A1 | 12/2010 | Hara |
| 2011/0095507 A1 | 4/2011 | Plantet |
| 2011/0097139 A1 | 4/2011 | Hsu |
| 2011/0109060 A1 | 5/2011 | Earle et al. |
| 2011/0202236 A1 | 8/2011 | Galasso et al. |
| 2011/0204201 A1 | 8/2011 | Kodama |
| 2011/0257848 A1 | 10/2011 | Shirai |
| 2012/0006949 A1 | 1/2012 | Laird |
| 2012/0080279 A1 | 4/2012 | Galasso et al. |
| 2012/0228906 A1 | 9/2012 | McAndrews |
| 2012/0253599 A1 | 10/2012 | Shirai |
| 2012/0274043 A1 | 11/2012 | Lee |
| 2013/0090195 A1 | 4/2013 | Yamaguchi |
| 2013/0119634 A1 | 5/2013 | Camp |
| 2013/0221713 A1 | 8/2013 | Pelot et al. |
| 2014/0061419 A1 | 3/2014 | Wehage |
| 2015/0197308 A1 | 7/2015 | Butora |

FOREIGN PATENT DOCUMENTS

| | | |
|---|---|---|
| EP | 1241087 A1 | 9/2002 |
| EP | 1355209 A1 | 10/2003 |
| JP | 57173632 U | 11/1982 |
| JP | 57182506 A | 11/1982 |
| JP | 01106721 A | 4/1989 |
| JP | 04-203540 | 7/1992 |
| JP | 05-149364 | 6/1993 |
| WO | 98/40231 | 9/1998 |
| WO | 99/06231 | 2/1999 |

OTHER PUBLICATIONS

"European Patent Office Final Decision dated Mar. 21, 2013", European Patent Application No. 10161906.2.

"European Search Report and Written Opinion, European Patent Application No. 13165362.8", Sep. 24, 2014, 6 Pages.

* cited by examiner

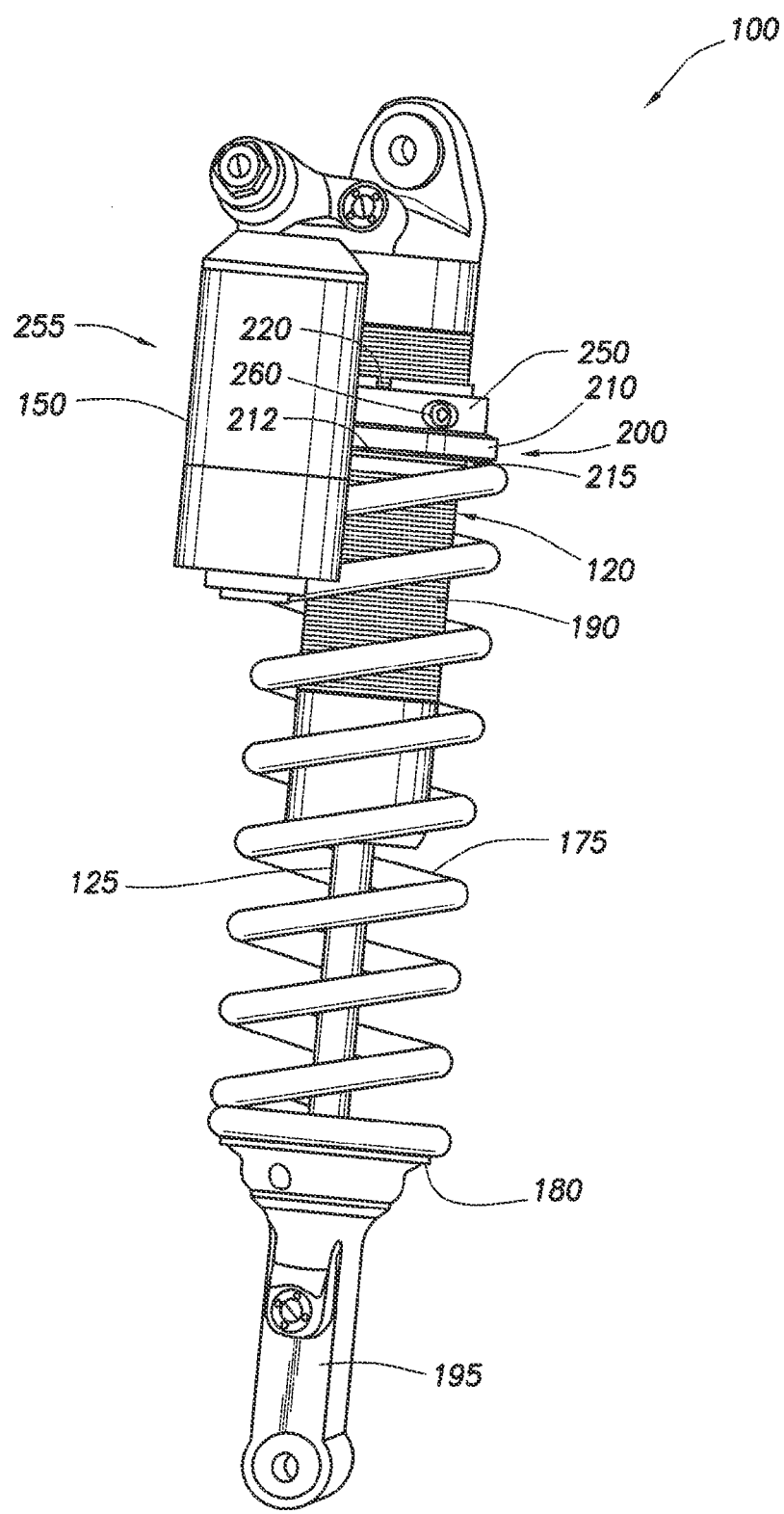

METHODS AND APPARATUS FOR SELECTIVE SPRING PRE-LOAD ADJUSTMENT

CROSS-REFERENCE TO RELATED APPLICATIONS

This application claims priority to and is a continuation of the patent application, U.S. patent application Ser. No. 12/727,915, filed on Mar. 19, 2010, entitled "METHODS AND APPARATUS FOR SELECTIVE SPRING PRE-LOAD ADJUSTMENT", by Christopher Paul Cox et al., and assigned to the assignee of the present invention, the disclosure of which is hereby incorporated herein by reference in its entirety.

The U.S. patent application Ser. No. 12/727,915 claims priority to and benefit of U.S. Provisional Patent Application No. 61/161,620, filed on Mar. 19, 2009, entitled "METHODS AND APPARATUS FOR SELECTIVE SPRING PRE-LOAD ADJUSTMENT" by Christopher Paul Cox et al., which is incorporated herein, in its entirety, by reference.

The U.S. patent application Ser. No. 12/727,915 claims priority to and benefit of U.S. Provisional Patent Application No. 61/161,552, filed on Mar. 19, 2009, entitled "METHODS AND APPARATUS FOR SELECTIVE SPRING PRE-LOAD ADJUSTMENT" by Christopher Paul Cox et al., which is incorporated herein, in its entirety, by reference.

BACKGROUND OF THE INVENTION

Field of the Invention

Embodiments of the present invention generally relate to a user-adjustable spring for use in a shock absorber.

Description of the Related Art

Integrated damper/spring vehicle shock absorbers often include a damper body surrounded by a mechanical spring. The damper often consists of a piston and shaft telescopically mounted in a fluid filled cylinder. The mechanical spring may be a helically wound spring that surrounds the damper body. Various integrated shock absorber configurations are described in U.S. Pat. Nos. 5,044,614; 5,803,443; 5,553,836; and 7,293,764; each of which is herein incorporated, in its entirety, by reference.

The spring mechanism of many shock absorbers is adjustable so that it can be preset to varying initial states of compression. In that way the shock absorber can be adjusted to accommodate heavier or lighter carried weight, or greater or lesser anticipated impact loads. In motorcycle racing, particularly off-road racing, shock absorbers may be adjusted according to certain rider preferences.

U.S. Pat. No. 5,044,614 ("the '614 patent") shows a damper body carrying a thread 42. A helical spring 18 surrounds the damper body where the two form an integrated shock absorber. The compression in the helical spring 18 may be pre-set by means of a nut 48 and a lock nut 50. Because the nut 48 and lock nut 50 must be relatively torqued to prevent nut 50 rotation upon final adjustment, the shock absorber must typically be removed from its vehicle in order to allow torquing wrench access. Once the spring 18 is in a desired state of compression, lock nut 50 is rotated, using a wrench, up against nut 48 and tightened in a binding relation therewith.

The system described in the '614 patent requires that the user be able to access a large amount of the circumference of the shock absorber, and specifically the nut 48 and lock nut 50, with a wrench (e.g. col. 4, lines 15-17). Unfortunately many shock absorbers, as mounted on a corresponding vehicle, are fairly inaccessible, and have limited surrounding wrench space because of other surrounding vehicle hardware and/or, as in the instant case, a separate damping fluid reservoir or "piggyback." What is needed is a shock absorber having a spring that can be readily adjusted while the shock absorber is mounted on a vehicle. What is needed is a motorcycle "monoshock" having a spring that can be easily adjusted without removing the shock from the motorcycle. What is needed is a shock absorber having a spring where the state of spring adjustment is constantly indicated and easily visible while the shock is mounted on a vehicle.

SUMMARY

The present invention generally relates to a suspension comprising a spring assembly having a threaded member at a first end for imposing axial movement in the spring as the spring is rotated and thereby rotating the threaded member relative to a second component. In one embodiment, the system includes a damper for metering damping fluid and a rotatable spring member coaxially disposed around the damper and rotatable relative to the damper. In one embodiment an adjustment assembly includes a spring adjustment nut (e.g. follower nut) and clamp with the adjustment nut disposed on a threaded portion of the second component. When the clamp is loosened, the adjustment or "follower" nut rotates with the spring which is rotated by a user and the rotation thereby compresses or decompresses the spring as the nut moves axially (by thread pitch) along the threaded second component. In one embodiment, the clamp includes an indicator that cooperates with markings on the second component to indicate the compression state of the spring.

BRIEF DESCRIPTION OF THE DRAWINGS

So that the manner in which the above recited features of the present invention can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a perspective view of a shock absorber having a user-adjustable spring.

DETAILED DESCRIPTION

Figure 2A:
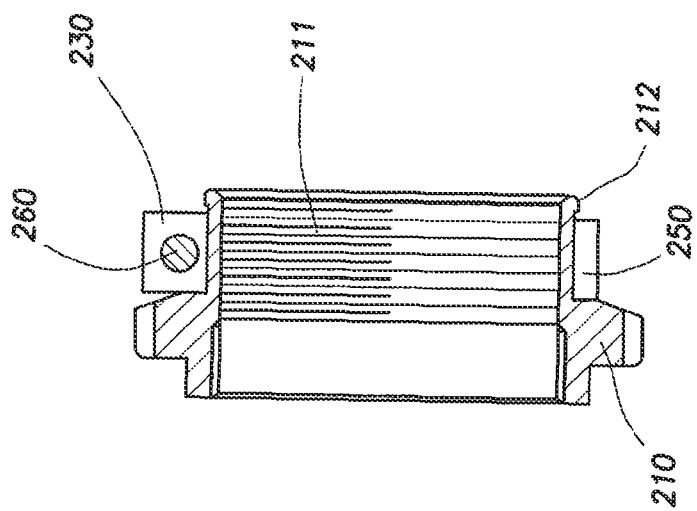
FIG. 2 is an exploded view of a follower nut and clamp, and 2A is a section view thereof.

FIG. 1 shows an embodiment of a reservoir type shock absorber 100. The shock absorber includes a second component, such as in this embodiment a damper body 120, with a rod 125 extending therefrom and a reservoir 150 is in fluid (e.g. damping fluid such as hydraulic oil) communication with the damper body 120. The shock further includes a helical spring 175 annularly disposed about the damper body 120 and captured axially between a bottom clip 180 at a lower end and an adjuster assembly 200 at an upper end. An outer surface of the damper body 120 includes threads 190 that facilitate rotation of nut 210 and corresponding axial movement of the adjuster assembly 200 relative to the body 120.

One embodiment of the adjuster assembly 200 is best appreciated with reference to all of the Figures and comprises a follower nut 210 and a clamp 250. In one embodiment the follower nut 210 includes a pin 215 for fitting into a hole 216 (shown in FIG. 2) in a flange of the nut 210. Referring to FIG. 3, the pin 215 rotationally indexes the follower nut 210 to the spring 175 at an interface 300 between an abrupt end 470 of the wound wire and an upwardly inclined upper surface of the same wound wire in the coil preceding (i.e. directly underneath) the abrupt end 470 of the helical spring 175. In one embodiment, pin 215 extends axially (i.e. parallel to the longitudinal axis of the shock absorber 100) downward from follower nut 210 and extends into the interface space 300. Due to interference between the pin 215 and the abrupt end 470 of spring 175 in one direction (referring to FIG. 3) and the helical angle of the spring wire in the other direction where the end and the angle combined form an axial recess at an upper end of the spring 175, rotation of the spring 175 will interfere with the pin (or key or tooth) 215 and impart a rotational force (via the pin 215) to the follower nut 210. Conversely, rotation of the follower nut 210 will carry the pin 215 and a rotational force will be correspondingly transmitted to the spring 175. In one embodiment (not shown) an upper portion of the spring 175 adjacent the abrupt end 470 is tapered to increase the surface contact between the spring and a lower end of the follower nut 210 (i.e. the spring end is ground "flat"). In one embodiment (not shown) the flattened last coil portion of the upper end of the spring includes an axial hole drilled therein for receiving the portion of pin 215 that protrudes from hole 216. In one embodiment the upper end of the spring is castellated and the lower surface 212 of the nut 210 is castellated such that the castellations of the nut and the spring are interengageable for rotationally fixing the nut 210 to the spring 175. In one embodiment, the nut 210 includes a ratcheting pawl set on a lower surface thereof and the spring includes suitable beveled one way castellations on an upper surface thereof (or vice versa) and the spring and the nut are therefore rotationally engaged in one rotational direction only (depending on the sense of the ratchet set) and relatively freely rotatable in the other rotational direction. In one embodiment, the spring 175 is rotatable in relation to the bottom clip 180. In another embodiment the bottom clip 180 is bearing-mounted (e.g. with a race of ball bearings disposed between a lower end of the spring and an upward facing surface of the bottom clip 180 in axially abutting relation to each) to a shock mount 195 and thereby facilitates easier rotation of the spring 175 relative to the damper body 120 (by reducing the relative apparent coefficient of friction between the bottom clip and the lower end of the spring). In one embodiment, the spring comprises a plurality of springs axially abutted one with another where each of the springs has a different spring rate. In one embodiment, at least one spring of a shock absorber is wound having a compound spring rate. It is worth noting that as the spring 175 is placed in greater states of compression, the friction force between the spring 175 and its axial abutments at the clip 180 and the follower nut 210 are increased.

While the follower nut 210 is a separate component in some embodiments, it will be understood that the nut can be integral with the spring 175 whereby one end of the spring is therefore effectively threaded to the damper housing and axially adjustable upon rotation of the spring while an opposite end of the spring is axially fixed but rotationally movable relative to the damper body. In one embodiment, the clamp member can also be formed to simply include a threaded member, for instance, that interacts with the damper body to prevent rotation between the threads of the integral spring/nut/clamp and the threaded damper body. In one embodiment, the bottom portion 180 includes a cylindrical member, or body, (not shown) axially and upwardly disposed within and along the spring 175. In one embodiment the cylindrical member is threaded along an axial exterior length thereof. In one embodiment an adjustment assembly 200 is located between bottom clip or annular "lip" 180 and a lower end of the spring 175. Much as has been previously described in relation to threads 190 and the nut 210, in one embodiment the threads 211 on an inner diameter of nut 210 are engaged with threads on an outer diameter of the cylindrical member (not shown). The pin 215 engages a recess 300 at a lower end of the spring 175. As previously described, rotation of the spring 175 correspondingly rotates the nut 210, via pin 215, and the nut 210 translates axially along the cylindrical member thereby increasing or decreasing the compression in the spring 175 depending on the direction of rotation and the directional "sense" of the threads. In one embodiment the cylindrical member (not shown) has an inner diameter that is larger than the outer dimensions of the spring and is disposed axially upward along the shock and outside of the spring. A nut is threaded on an outer diameter thereof and engaged with an end of the spring and the cylinder is threaded on an inner diameter thereof and the nut, cylinder and spring cooperate as principally described herein to facilitate adjustment of compression in the spring. In one embodiment the spring includes an assembly 200 and corresponding threaded sections (e.g. 190, cylindrical member) at each of its ends. In one embodiment the threads at each end are opposite in "sense" so that rotation of the spring increases or decreases compression in the spring twice as fast as a single threaded end version. In one embodiment threads at one end are of a different pitch than threads at the other end of the spring 175.

Figure 2:
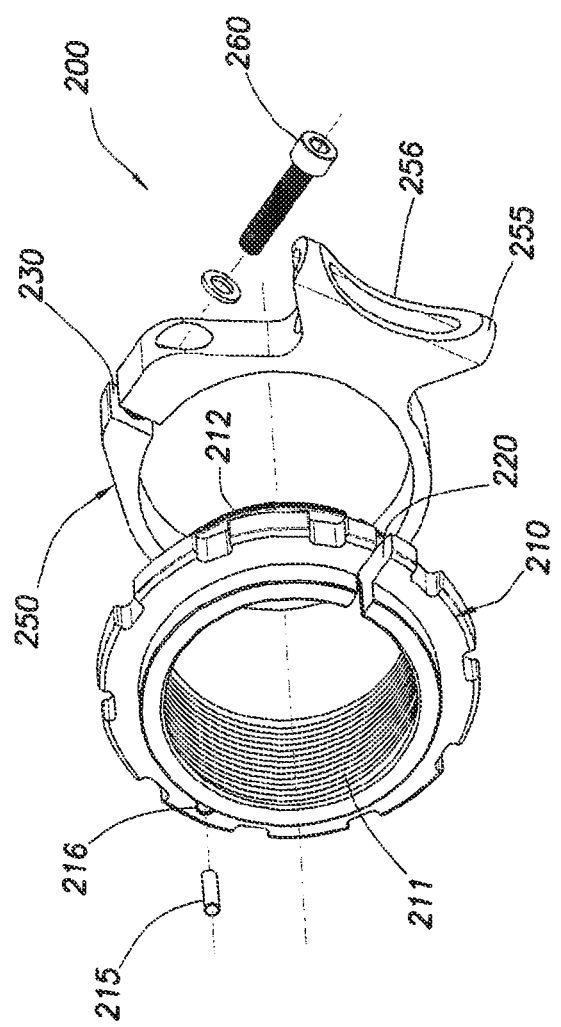
Figure 3:
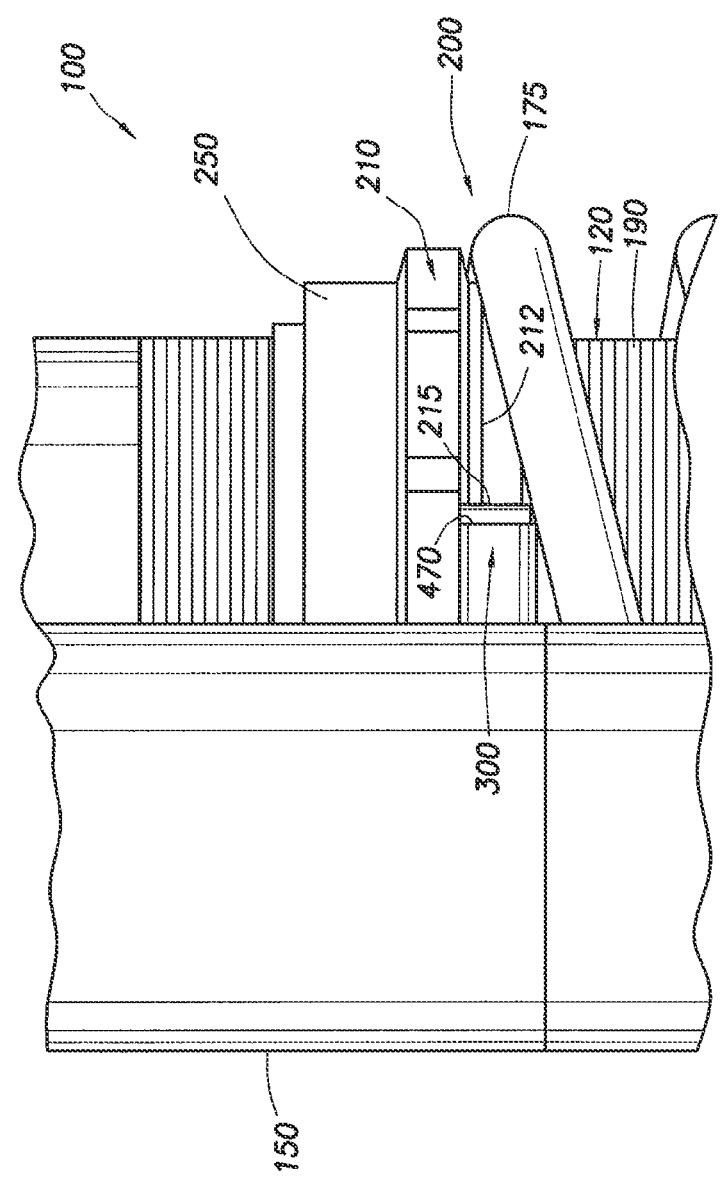
FIG. 3 is an enlarged view showing an interface between the clamp, follower nut and spring.
Figure 4:
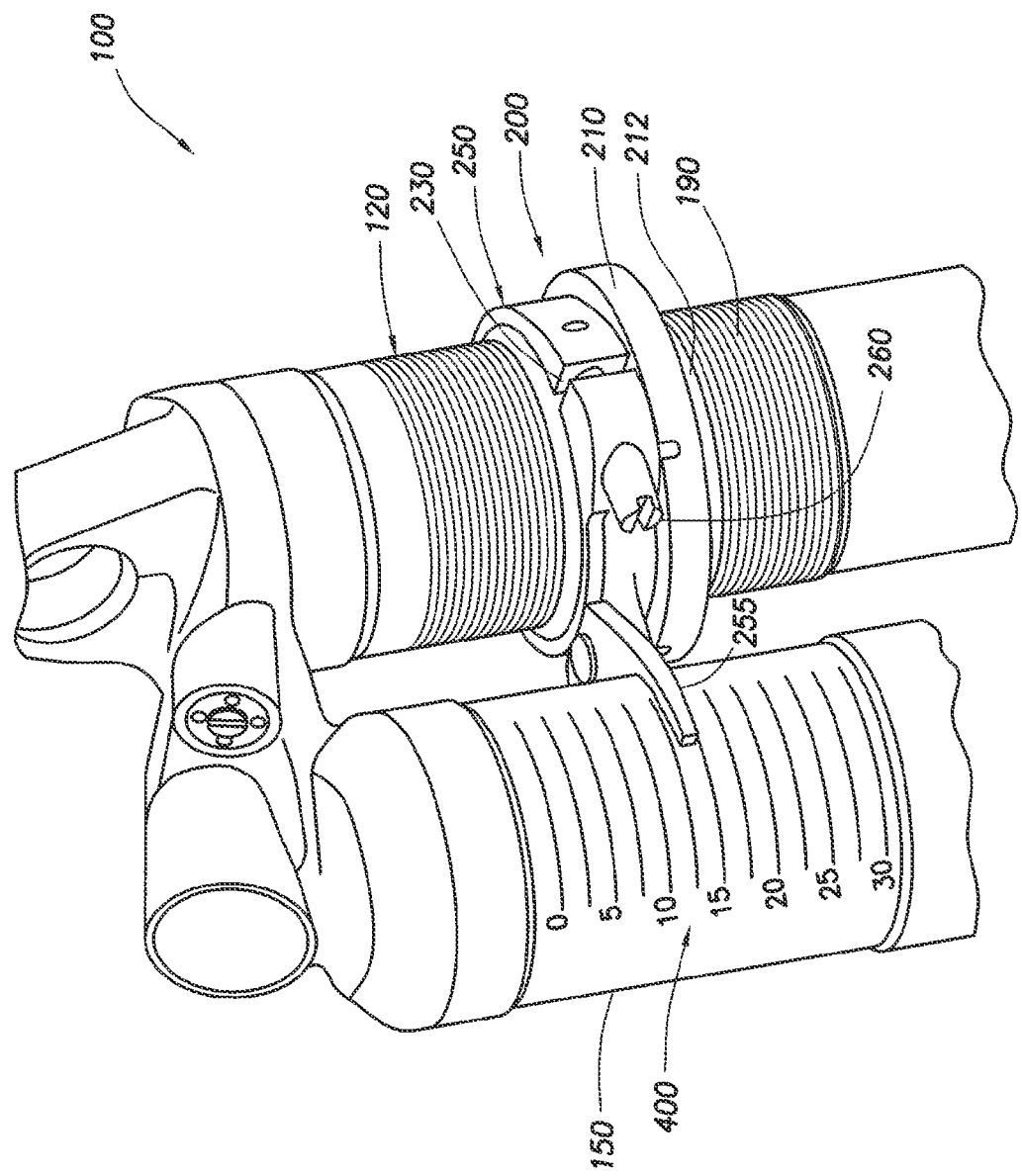
FIG. 4 is a perspective detailed view of the shock absorber.

FIGS. 2 and 2A show details of embodiments of the clamp 250 and follower nut 210. In one embodiment the follower nut 210 is cylindrical (with varying diameters along its length) generally with a cut though or split 220, giving it the form of a "C" ring. The clamp 250 is also in the form of a "C" ring, being generally cylindrical and having its own cut or split 230. As can be seen in FIG. 2A, the clamp 250 fits over the follower nut 210. In one embodiment the clamp 250 is expanded elastically at the split 230 to clear a lip 212 at a smaller-diameter end of the follower nut. Once the clamp 250 has cleared the lip, it is returned to a "relaxed" state surrounding a portion of the nut 210 and is rotationally movable relative thereto. The clamp 250 may then rotate about the follower nut 210 (and the follower nut 110 may rotate within the clamp 250) but the clamp 250 is retained axially on the follower nut 210 by lip 212. In one embodiment a screw 260, with a suitable washer is inserted into the clamp 250 but not tightened until such time as rotational and axial retention of the follower nut 210 on the damper body 120 (e.g. because spring adjustment is complete) is desired. In one embodiment, the adjuster assembly 200, with its nut 210 and clamp 250, is threaded onto threads 190 of body 120, and is moved axially (e.g. by rotation of the threaded (211) nut 210 about threads 190) until an indicator 255 (best seen in FIGS. 2 and 4) formed on the clamp 250 is located adjacent the reservoir 150. In one embodiment a curved surface 256 of the indicator 255, corresponding generally to the curved shape of the reservoir body is aligned with the exterior of the reservoir 150 and the follower nut 210 and clamp 250 may be axially translated further toward a lower end of the shock 100 by rotation of follower nut 210 (while clamp 250 remains aligned with reservoir 150 via indicator 255). Tightening the screw 260 "closes" the C-shaped clamp 250 and correspondingly closes the follower nut 210 thereby preventing the follower nut 210 from rotating on the threaded surface 190 of the damper body 120, and therefore frictionally (e.g. as a clamp) locking the nut 210 to the damper body and thus retaining the user-adjusted compression in the spring 175.

In one embodiment the indicator 255 connected on clamp 250, and rotationally fixed relative to the clamp 250, serves at least two purposes. Its curved surface 256 conforms to a portion of an exterior of the reservoir 150, thereby preventing rotation of the clamp 250 during rotation of the spring 175. As such the orientation of screw 260 is maintained relative to the shock absorber and the vehicle on which the shock absorber is mounted. Correspondingly, the screw 260 is maintained in an accessible location for tightening and loosening to facilitate spring 175 adjustment while the shock absorber remains mounted on the vehicle. Second, the indicator 255 serves to indicate axial compression state of the spring 175 relative to a scale 400 (referring to FIG. 4).

In one example, the clamp 250 is loosened by inserting an appropriate hex or blade type wrench or screw driver (not shown) through a predetermined shock absorber access space available in the vehicle (vehicle such as a monoshock rear shock motorcycle) and rotating screw 260 counterclockwise (assuming a right hand thread screw 260) to loosen the clamp. Once the clamp 250 is loose, the spring 175 can be manually gripped, through the access space, by a user and rotated manually, for example, in one embodiment having right hand threads 190 from the top axial view of the shock absorber, clockwise as viewed from the upper end, to increase compression or pre-load in the spring 175. In that embodiment rotating the spring 175 counterclockwise as viewed from above reduces pre-load of the spring 175 (or vice versa depending on the sense of threads 190). As previously described, such rotation of the spring 175 causes rotation of the follower nut 210 and corresponding axial translation of the follower nut 210 (based on the pitch of the threads 190) relative to the damper body 120 and along threads 190. Axial movement of the follower nut 210, relative to non-axially moving bottom clip 180, increases or decreases compression pre-load in spring 175. In one embodiment, when the desired pre-load is obtained, as indicated by movement of the indicator 255, which moves axially with the nut 210, relative to the scale 400, the clamp 250 is retightened by rotating screw 260 clockwise. It should be noted that the scale 400 may be placed on any suitable and axially static component relative to the follower nut 210/clamp 250 and the indicator 255 may be structured to "point" appropriately thereto. In one embodiment the numerical markers on the scale 400 are indicative of a percentage of compression preload in the spring. In one embodiment, the scale and indicator are visible from an exterior of an assembled vehicle with the shock absorber having the scale and indictor mounted thereon. In one embodiment, the scale 400 and indicator 255 "pair" comprise a longitudinal wire coil and permanent magnet. Position of the magnet relative to the coil is indicated by a state of current through the coil and can be calibrated to correspond to a state of spring compression. In one embodiment the "scale/indicator" pair comprises a proximity sensor and a datum structure. In one embodiment an electronic "scale/indicator" pair is connected to a transmission circuit having wireless protocol capabilities, such as Garmin's ANT plus, and shock spring compression data is transmitted in real time or in packets to a user interface/output device such as for example Garmin's 705 edge GPS enabled computer. In one embodiment the shock absorber is a monoshock and is accessible and visible, while mounted in a functional position, through a limited access space of the monoshock equipped vehicle.

While the foregoing is directed to certain embodiments of the present invention, other and further embodiments of the invention may be devised without departing from the basic scope thereof, and the scope thereof is determined by the claims that follow.

The invention claimed is:

1. A suspension system comprising:
   a cylindrical body;
   a rotatable spring member coaxially disposed around the cylindrical body, the rotatable spring member rotatable relative to the cylindrical body;
   a follower nut disposed in threaded engagement with a threaded portion of the body and abutting a first end of the spring and rotationally indexed with the spring, the follower nut is constructed and arranged to affect compression of the spring while translating axially along the threaded portion, wherein an axial position of the follower nut is indicated relative to a piggyback reservoir operable with a damper; and
   a visual indicator and a scale coupled with said piggyback reservoir, the visual indicator and scale operable to indicate an amount of spring compression.

2. The system of claim 1, wherein the follower nut includes a pin member extending towards and indexing with an axial end of the rotatable spring member, whereby said indexing causes the rotatable spring member and follower nut to rotate together.

3. The system of claim 1, wherein at least one of the rotatable spring member and follower nut rotates as the other of the rotatable spring member and follower nut is manually rotated.

4. The system of claim 1, further comprising:
   a clamp, the clamp constraining the follower nut in a rotational position corresponding to a desired amount of spring compression.

5. The system of claim 4, wherein the clamp comprises a visual indicator and a scale, the visual indicator and scale operable to indicate the amount of spring compression.

* * * * *